No. 749,780. PATENTED JAN. 19, 1904.
C. FLAGLER.
SPEAR FOR SHADE ROLLERS.
APPLICATION FILED OCT. 29, 1903.
NO MODEL.

WITNESSES:
J. S. See
W. J. Cathcart

INVENTOR
Claude Flagler
BY
Geo. B. Willcox ATTORNEY

No. 749,780. Patented January 19, 1904.

UNITED STATES PATENT OFFICE.

CLAUDE FLAGLER, OF BAY CITY, MICHIGAN, ASSIGNOR TO THE QUAKER SHADE ROLLER COMPANY, OF BAY CITY, MICHIGAN.

SPEAR FOR SHADE-ROLLERS.

SPECIFICATION forming part of Letters Patent No. 749,780, dated January 19, 1904.

Application filed October 29, 1903. Serial No. 178,997. (No model.)

*To all whom it may concern:*

Be it known that I, CLAUDE FLAGLER, a citizen of the United States, residing at Bay City, in the county of Bay and State of Michigan, have invented certain new and useful Improvements in Spears for Shade-Rollers; and I do hereby declare the following to be a full, clear, and exact description of the invention, such as will enable others skilled in the art to which it appertains to make and use the same.

This invention relates to shade-rollers, and pertains more particularly to part of the shade-roller known as the "spear," or the member that is attached to the spring and projects into the bracket that supports the roller.

The improvement consists in the device whereby the shade-roller cap is held against endwise movement and is permitted to revolve freely on the spear.

The object of the invention is to so construct the device for preventing endwise movement that it shall be flush, or nearly so, with the face of the cap to reduce the liability of threads or ravelings catching on the spear and interfering with the action of the roller, and a further object is to reduce the cost of manufacturing the spear and assembling the parts.

My invention is illustrated in the accompanying drawings, in which—

Figure 1:
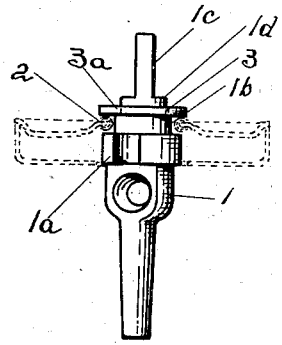
Figure 2:
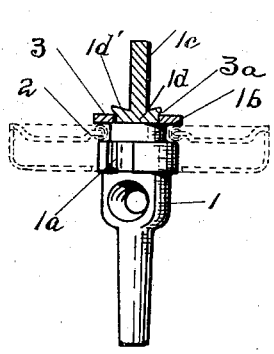
Figure 3:
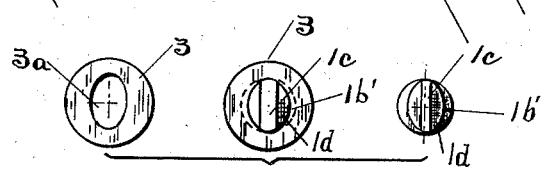
Figure 4:
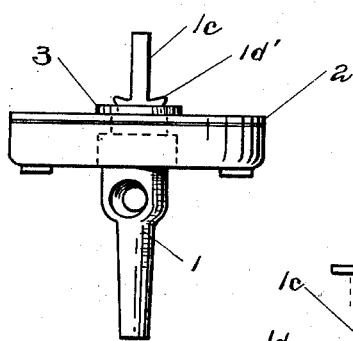
Figure 5:
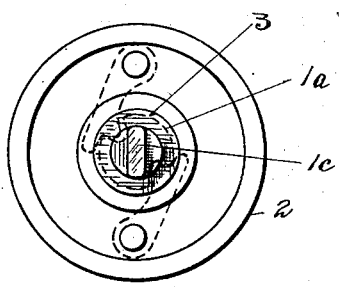
Figure 6:
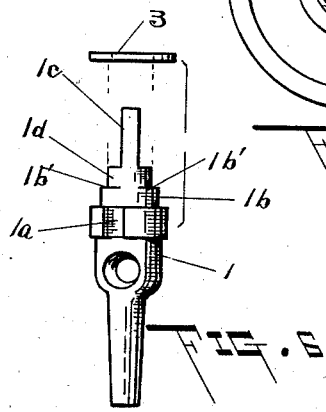

Figure 1 is an enlarged side elevation of a spear embodying my improvement. Fig. 2 is a similar view showing the cap-retaining washer fixed in place. Fig. 3 shows an end view of the spear and washer both assembled and separated. Fig. 4 is a side elevation of the spear and cap assembled. Fig. 5 is a top view of the parts shown in Fig. 4. Fig. 6 is a detail showing the manner of assembling the spear and washer.

As is clearly shown in the drawings, the device consists in the spear 1, having the ratchet $1^a$ and the cylindrical journal or bearing $1^b$, upon which the shade-roller cap 2 revolves when the shade is rolled or unrolled.

The present invention, as above stated, relates particularly to the means for maintaining the cap 2 in proper relation to the bearing $1^b$, and one of its objects is to enable the flatted end $1^c$ of the spear to be located as close as possible to the cap 2, as in Figs. 1 and 2. To accomplish this result, I make the cylindrical journal $1^b$ just long enough to receive the bearing portion of the cap 2 and permit its proper rotation. Just above the journal $1^b$ the diameter of the spear is reduced on the opposite sides corresponding to the flatted faces of the end $1^c$, thus making the reduced portion of approximately elliptical cross-section, as shown in Fig. 3. A metal washer 3, having an elliptical opening $3^a$, is dropped down over the elliptical part $1^d$ of the spear. The bottom face of the washer rests on the shoulders $1^{b'}$, Fig. 6, formed on the end of the cylindrical journal $1^b$ by reducing the part $1^d$, as above described. The part $1^d$ is of sufficient length to project a short distance above the top face of the washer 3, as shown in Fig. 1, and serves the double purpose of holding the washer against rotation and of locking it rigidly to the journal $1^b$ when the projecting end is swaged out on opposite sides of the flatted end $1^c$, as shown in Figs. 2 and 4. This swaging may be accomplished by pressing-dies or in any other suitable manner. The outwardly-swaged ends $1^{d'}$ of the part $1^d$ press the washer firmly down upon the shoulders $1^{b'}$ and lock it there rigidly.

By the means above described I have produced a device that not only permits free rotation of the shade-roller cap 2 and prevents its endwise movement, but permits of the very short compact journal $1^b$, and is of such construction that it projects only very slightly, if at all, beyond the face of the cap. This construction gives less opportunity for ravelings from the shade to catch, and it also permits the flatted end $1^c$ to be brought closer to the cap 2 than is the case where cup-shaped eyelets are used in lieu of the washer 3. This construction enables me to make the washers 3 from cheap material, whereas eyelets that have to be pressed or stretched into shape must be of much better and more expensive material. This difference in cost of material, while apparently very slight, in reality amounts to a most important item in the manufacture of shade-rollers, which are usually sold at very low prices. In order to be manufactured at a profit, shade-rollers must be turned out in very large quantities. Under these circumstances the saving in cost of the washer herein described over the cost of eyelets or similar devices that have to be pressed into shape, and consequently must be made from more expensive material, amounts to several thousand dollars a year.

What I claim as my invention, and desire to secure by Letters Patent, is as follows:

1. In a spear for shade-rollers, having a cylindrical journal and a flatted end; a washer having an opening adapted to receive said flatted end; a projection on the spear engaging said opening and adapted to lock the washer against the end of the journal; said projection being formed by swaging out the metal of the spear.

2. A spear formed with a cylindrical journal and a flatted end; a reduced portion intermediate the journal and the flatted end, said reduced portion being of less thickness than the diameter of the journal; a washer having an opening adapted to receive said reduced portion; the outer edges of said reduced portion being swaged outward to rigidly hold said washer against the end of said journal.

3. A spear formed with a short cylindrical journal and a flatted end; a reduced portion of approximately elliptical cross-section intermediate the journal and the flatted end; said reduced portion being of less thickness than the diameter of the journal; a washer of less thickness than the length of said reduced portion and having an opening adapted to receive said reduced portion, the outer edges of said reduced portion being swaged outward to overlap and rigidly hold the washer against the end of said journal.

In testimony whereof I affix my signature in presence of two witnesses.

CLAUDE FLAGLER.

Witnesses:
MILTON S. JANES,
ELISABETH PAXSON.